United States Patent [19]

Komiya et al.

[11] Patent Number: 4,534,685
[45] Date of Patent: Aug. 13, 1985

[54] TRACER CONTROL SYSTEM

[75] Inventors: Hidetsugu Komiya, Hino; Etsuo Yamazaki, Hachioji, both of Japan

[73] Assignee: Fanuc Ltd., Tokyo, Japan

[21] Appl. No.: 451,152

[22] PCT Filed: Apr. 9, 1982

[86] PCT No.: PCT/JP82/00118
§ 371 Date: Dec. 1, 1982
§ 102(e) Date: Dec. 1, 1982

[87] PCT Pub. No.: WO82/03590
PCT Pub. Date: Oct. 28, 1982

[30] Foreign Application Priority Data

Apr. 10, 1981 [JP] Japan .................. 56-54149

[51] Int. Cl.³ ............ B23Q 35/14; H02P 7/06; G06F 15/46
[52] U.S. Cl. ............ 409/99; 318/578; 364/474; 409/80; 409/98
[58] Field of Search ............ 409/80, 98, 99, 127, 409/79; 318/569, 571, 574, 573, 570, 578, 579; 364/474

[56] References Cited

U.S. PATENT DOCUMENTS

| 4,224,670 | 9/1980 | Yamazaki | 364/474 |
| 4,355,362 | 10/1982 | Imazeki et al. | 318/579 X |
| 4,412,295 | 10/1983 | Imazeki et al. | 318/578 X |
| 4,426,180 | 1/1984 | Imazeki et al. | 409/99 |
| 4,433,275 | 2/1984 | Imazeki et al. | 318/578 |
| 4,456,864 | 6/1984 | Imazeki et al. | 318/578 |
| 4,456,962 | 6/1984 | Imazeki et al. | 318/571 X |
| 4,467,432 | 8/1984 | Imazeki et al. | 318/578 X |

FOREIGN PATENT DOCUMENTS

| 0034006 | 8/1981 | European Pat. Off. | 409/99 |
| 46-38449 | 12/1971 | Japan | 318/570 |
| 5558954 | 10/1978 | Japan | 409/80 |
| 0049692 | 4/1979 | Japan | 409/127 |
| 140280 | 10/1979 | Japan | 318/578 |
| 55-10675 | 3/1980 | Japan | 409/80 |
| 0065057 | 5/1980 | Japan | 409/80 |
| 231902 | 3/1970 | U.S.S.R. | 318/570 |
| 369548 | 5/1973 | U.S.S.R. | 318/578 |
| 881672 | 11/1981 | U.S.S.R. | 318/574 |
| 938264 | 6/1982 | U.S.S.R. | 318/578 |

OTHER PUBLICATIONS

English translation of the claims of Japanese Pat. Nos. 55-58954 and 55-106753.

Primary Examiner—William R. Briggs
Attorney, Agent, or Firm—Staas & Halsey

[57] ABSTRACT

The present invention pertains to a tracer control system for a system performing tracing in an arbitrary direction through using a combination tracer control-numerical control unit which is a combination of a tracer control unit and a numerical control unit, and is intended to increase the cutting accuracy and cutting speed by controlling the feed by tracer control, as compared with a conventional system which controls the feed by numerical control.

The numerical control unit is provided with a signal generating device, such as a controller, for generating a signal representing the angle of a feed shaft according to numerical information indicating a path of cutting. The tracer control unit is provided with a first coordinate transformation circuit which generates a displacement component signal in the direction of the feed shaft and a second coordinate transformation circuit for converting, according to the output of the signal generating device, a signal representing the velocity in the direction of the feed shaft into signals for controlling feed rates along the X-axis and the Y-axis. Thereby feed along the X-axis and the Y-axis is controlled by the output of the coordinate transformation circuit.

7 Claims, 4 Drawing Figures

TRACER CONTROL SYSTEM

BACKGROUND OF THE INVENTION

The present invention relates to a tracer control system which improves the cutting accuracy and the cutting speed of tracing in an arbitrary direction using a combination tracer control-numerical control unit capable of cutting a workpiece by either tracer control or numerical control.

In the case where arbitrary-direction tracing, which permits feed at an arbitrary angle to the X- or Y-axis, is carried out through the use of a combination tracer control-numerical control unit, it is conventional in the prior art to cut a workpiece with a cutter while controlling the X-axis and the Y-axis by numerical control and the Z-axis by tracer control. That is to say, the prior art employs one-axis tracing, and hence possesses defects such that sufficient cutting accuracy cannot be obtained, and the cutting speed cannot be increased.

SUMMARY OF THE INVENTION

The present invention overcomes the above-described defects and has an object of providing increased cutting accuracy and cutting speed in arbitrary-direction tracing using a combination tracer control-numerical control unit.

A system according to the present invention includes a tracer control-numerical control unit which combines tracer control and numerical control. A signal generating device, such as a controller, provides a numerical control function by generating a signal representing the angle of a feed shaft according to numerical information, indicating a path of cutting. Signals for tracer control are generated by first and second coordinate transformation circuits. The first coordinate transformation circuit generates a displacement component signal in the direction of the feed shaft. The second transformation circuit, in accordance with the signal generating device, distributes signals controlling the direction and feed rates of the feed shaft.

DESCRIPTION OF THE PREFERRED EMBODIMENTS

An embodiment of the present invention will hereinafter be described in detail.

Figure 1:
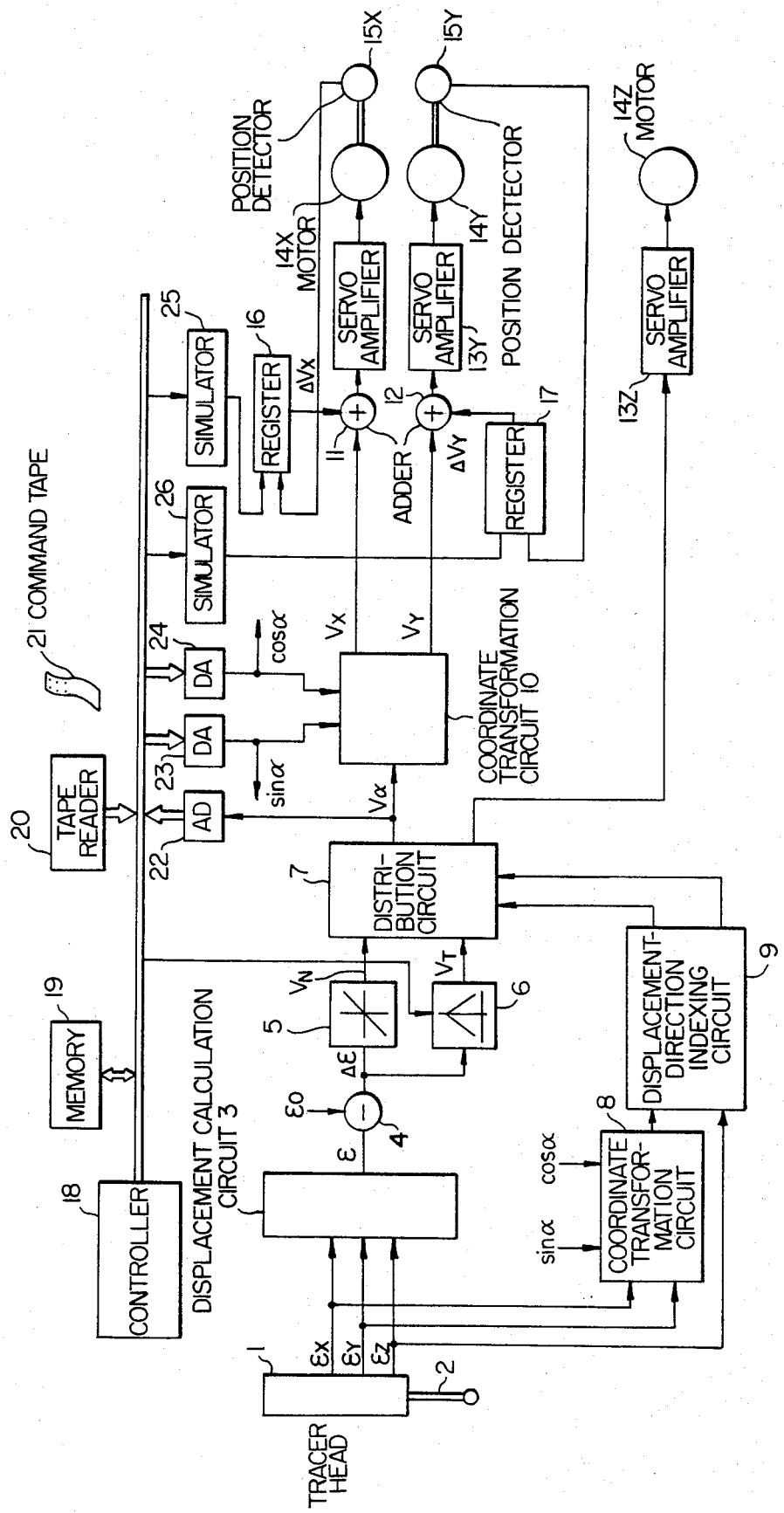
FIG. 1 is a block diagram of an apparatus embodying the system of the present invention.

FIG. 1 is a block diagram of a tracer control-numerical control unit embodying the system of the present invention. Reference numeral 1 is a tracer head, 2 a stylus, 3 a displacement calculation circuit, 4 a subtracter, 11 and 12 adders, 5 and 6 velocity calculation circuits, 7 a distribution circuit, 8 and 10 coordinate transformation circuits and 9 a displacement-direction indexing circuit. Reference numeral 13X, 13Y and 13Z are servo amplifiers, 14X, 14Y and 14Z motors, 15X and 15Y position detectors, 16 and 17 registers, 18 a controller, 19 a memory, 20 a tape reader, 21 a command tape, 22 an AD converter, 23 and 24 DA converters, and 25 and 26 simulators.

Figure 2:
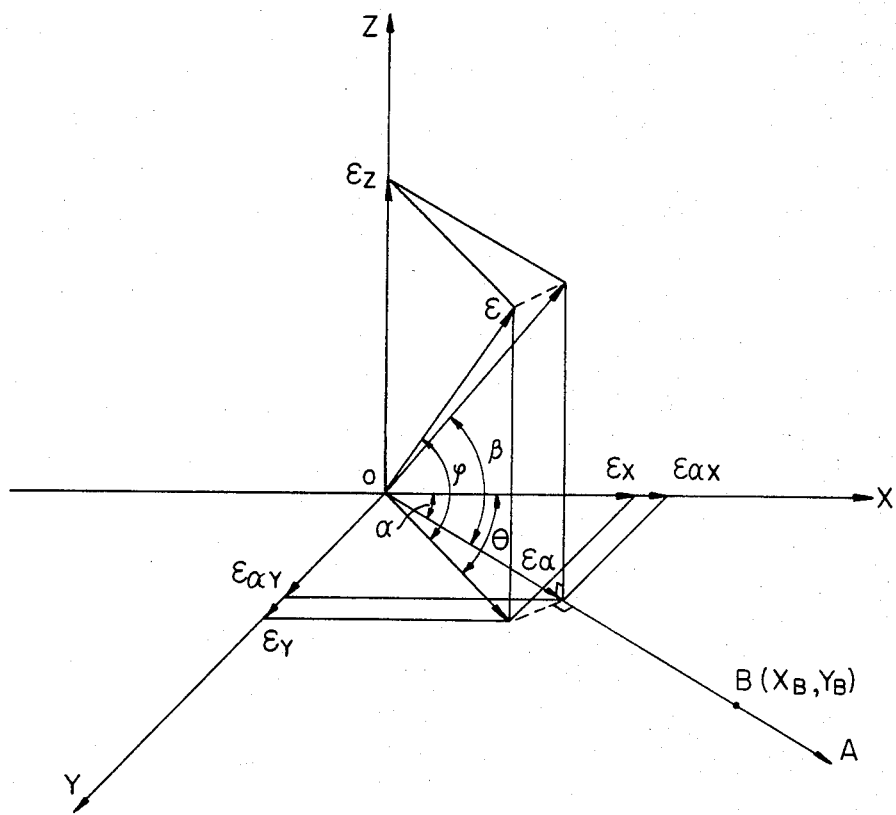
FIG. 2 is a vector diagram of the relationships of respective signals.

Three differential transformers (not shown) corresponding to the X-, Y- and Z-axes, provided in the tracer head 1, are excited by an alternating current of a frequency f and, when the displacement vector $\bar{\epsilon}$ of the stylus 2 contacting a model (not shown) is such as shown in FIG. 2 (letting $2\pi ft = \omega$) signals $\epsilon_x$, $\epsilon_y$ and $\epsilon_z$ supplied by the tracer head 1 are output as follows:

$$\epsilon_x = \epsilon \cos \psi \cos \theta \sin \omega t \tag{1}$$

$$\epsilon_y = \epsilon \cos \psi \sin \theta \sin \omega t \tag{2}$$

$$\epsilon_z = \epsilon \sin \psi \sin \omega t \tag{3}$$

Now, consider the case of performing tracing from the origin O to a point B $(X_B, Y_B)$ along an axis A illustrated in FIG. 2. It will be assumed that the coordinates $(X_B, Y_B)$ of the point B are recorded as numerical information on the command tape 21 (FIG. 1).

Based on the numerical information of the command tape 21, that is, the coordinates of the point B, read by the tape reader 20, the controller 18 conducts the computations in the following equations (4) and (5) to obtain the sine and the cosine of the angle formed between the X-axis and the A-axis.

$$\sin \alpha = \frac{Y_B}{\sqrt{X_B^2 + Y_B^2}} \tag{4}$$

$$\cos \alpha = \frac{X_B}{\sqrt{X_B^2 + Y_B^2}} \tag{5}$$

The controller 18 supplies a digital signal indicating the $\sin \alpha$ to the DA converter 23 and a digital signal indicating the $\cos \alpha$ to the DA converter 24. The DA converters 23 and 24 convert the digital signal indicating the $\sin \alpha$ into analog signals both of which are provided to the coordinate transformation circuits 8 and 10.

Thereafter, the controller 18 causes the tracing to start. The displacement signals $\epsilon_x$, $\epsilon_y$ and $\epsilon_z$ supplied by the tracer head 1 are provided to the displacement calculation circuit 3. At the same time, the displacement signals $\epsilon_x$ and $\epsilon_y$ are applied to the coordinate transformation circuit 8 and the displacement signal $\epsilon_z$ is applied to the displacement-direction indexing circuit 9. The displacement calculation circuit 3 obtains a composite displacement $\epsilon = \sqrt{\epsilon_x^2 + \epsilon_y^2 + \epsilon_z^2}$ and provides it to the subtracter 4, which in turn obtains a difference $\Delta\epsilon$ between the composite displacement $\epsilon$ and a reference displacement $\epsilon_0$, which it supplies to the velocity calculation circuits 5 and 6. The velocity calculation circuits 5 and 6 respectively obtain a normal velocity $V_N$ and a tangential velocity $V_T$ and provide them to the distribution circuit 7. The coordinate transformation circuit 8, which may be implemented using a coordinate transformer 22 described in Japanese Pat. Appl. No. 14098/69, is supplied with the displacement signals $\epsilon_x$ and $\epsilon_y$ and the analog signals indicating the $\sin \alpha$ and the $\cos \alpha$. A displacement component signal $\epsilon_\alpha$ in the direction of the feed shaft given by the following equation (6), supplied by the coordinate transformation circuit 8 to the displacement-direction indexing circuit 9.

$$\epsilon_\alpha = \epsilon_x \cos \alpha + \epsilon_y \sin \alpha \tag{6}$$

Based on the signal $\epsilon_\alpha$ from the coordinate transformation circuit 8 and the displacement signal $\epsilon_z$ from the tracer head 1, the displacement-direction indexing circuit 9 indexes an angle $\beta$ in the A-Z plane, obtaining a cosine signal $\cos \beta \sin \omega t$ and a sine signal $\sin \beta \sin \omega t$ in the direction of displacement. The cosine signal $\cos \beta \sin \omega t$, the sine signal $\sin \beta \sin \omega t$, the normal velocity signal $V_N$ and the tangential velocity signal $V_T$ are applied to the distribution circuit 7. A multiplier circuit, a combiner circuit, etc. are included in the distribution circuit 7 for generating control signals of a velocity $V_\alpha$ in the A-axis direction and a velocity $V_Z$ in the Z-axis direction. The control signal of the velocity $V_Z$ in the Z-axis direction is applied to the servo amplifier 13Z, which drives the motor 14Z.

The control signal of the velocity $V_\alpha$ in the A-axis direction is applied to the AD converter 22 and the coordinate transformation circuit 10 which can be implemented by using the coordinate transformer 23 in Japanese Patent Application No. 14098/69. The coordinate transformation circuit 10 combines the control signal of the velocity $V_\alpha$ in the A-axis direction and the analog signals indicating the $\sin \alpha$ and the $\cos \alpha$ supplied by the DA converters 23 and 24 yielding control signals of a velocity $V_X$ in the X-axis direction and a velocity $V_Y$ in the Y-axis direction. The control signals $V_x$ and $V_y$ are supplied to the servo amplifiers 13X and 13Y which drive the motors 14X and 14Y, respectively, performing a feed in the A-axis direction.

As described above, according to the system of the present invention, when performing arbitrary-direction tracing using the combination tracer control-numerical control unit, the feed in the A-axis direction is not controlled according to numerical control information but the numerical control information is used merely for determining the direction of feed. Rather, feed control in the A-axis direction is carried out by tracer control, so that the cutting accuracy and the cutting speed can be increased.

Furthermore, in this embodiment, as described hereinbelow, the registers 16 and 17, the simulators 25 and 26 and the position detectors 15X and 15Y are provided, to prevent a deviation in the direction of feed due to an offset voltage or the like.

Figure 3:
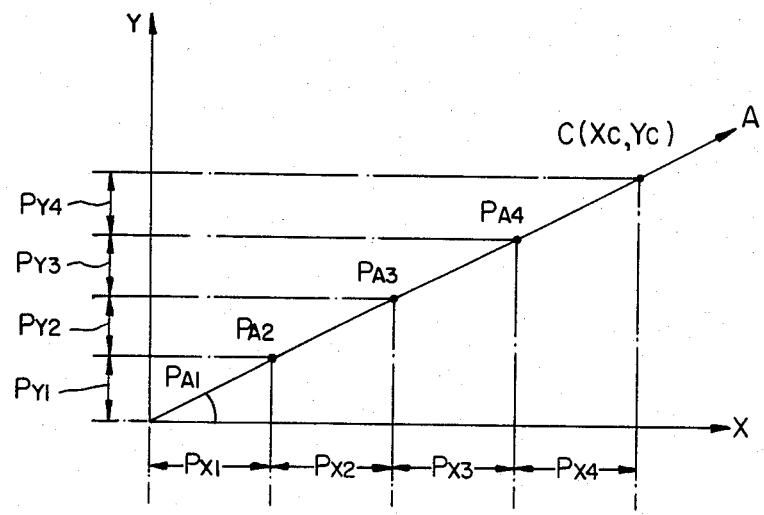
FIGS. 3 and 4 are diagrams of paths of movement controlled by the system of the present invention.

Now, consider the case of performing tracing from the origin O to a point C ($X_C$, $Y_C$) along the A-axis as illustrated in FIG. 3. Let it be assumed, in this case, that the command tape 21 has recorded thereon the coordinates ($X_C$, $Y_C$) of the point C.

Using a sampling rate of $\Delta T$, the controller 18 samples, via the AD converter 22, the control signal of the velocity $V_\alpha$ in the A-axis direction output by the distribution circuit 7. The controller 18 conducts the computation in the following equation (7), where n is an integer, obtaining the amount of movement $P_{An}$ in the A-axis direction for every constant time $\Delta T$.

$$P_{An} = V_A \cdot \Delta T \quad (7)$$

Next, the controller 18 performs the computation of the following equations to obtain the amounts of movement $P_{Xn}$ and $P_{Yn}$ in the X-axis and the Y-axis direction every constant time $\Delta T$ and provides these values via the simulators 25 and 26 to the registers 16 and 17. In the following equations, n is an integer and $\alpha$ is the angle between the X-axis and the A-axis.

$$P_{Xn} = \frac{P_{An} \cdot X_C}{\sqrt{X_C^2 + Y_C^2}} = P_{An} \cdot \cos \alpha \quad (8)$$

$$P_{Yn} = \frac{P_{An} \cdot Y_C}{\sqrt{X_C^2 + Y_C^2}} = P_{An} \cdot \sin \alpha \quad (9)$$

The other input terminals of the registers 16 and 17 receive the results of detection by the position detectors 15X and 15Y. When the results of detection differ from the amounts of movement $P_{Xn}$ and $P_{Yn}$ in the X-axis and the Y-axis direction per unit time $\Delta T$, simulators 25 and 26, the registers 16 and 17 respectively provide signals $\Delta X$ and $\Delta Y$ corresponding to the differences to the adders 11 and 12. The control signal velocities $V_x$ and $V_y$ in the X-axis and the Y-axis direction are corrected by the adders 11 and 12, respectively, before being issued to the servo amplifiers 13X and 13Y. The simulators 25 and 26 are used to allow for the delay time of the drive system for the motors or a movable machine part. In other words, the results of detection by the position detectors 15X and 15Y are obtained on the basis of the movement of the motor or the movable machine part which is delayed by the delay time of the drive system. Therefore, the amounts of movement $P_{Xn}$ and $P_{Yn}$ based on the output signal from the distribution circuit 7 is synchronized by the simulators 25 and 26 to the detection signals of the position detectors 15X and 15Y.

The controller 18 sequentially accumulates the amount of movement $P_{Xn}$ per unit time $\Delta T$ obtained by Eq. (8) and the amount of movement $P_{Yn}$ per unit time $\Delta T$ obtained by Eq. (9). When the accumulated values coincide with the coordinate value $X_C$, $Y_C$ of the X-Y coordinates of the point C, the controller 18 outputs zero to the simulators 25 and 26 and, at the same time, applies a control signal ST to the velocity calculation circuit 6, reducing the tangential velocity $V_T$ to zero. As a result, the outputs of the simulators 25 and 26 go to zero with a time function corresponding to the delay time of the drive system and the control signals of the velocities $V_X$ and $V_Y$ in the X-axis and the Y-axis direction from the coordinate transformation circuit 10 also become zero. When the contents of the registers 16 and 17 are reduced to zero by the outputs of the position detectors 15X and 15Y, the motors 14X and 14Y stop. Since this embodiment is arranged so that corrected velocity components $\Delta V_X$ and $\Delta V_Y$ are generated according to the difference between the outputs of the simulators 25 and 26 and the results of detection by the position detectors 15X and 15Y as described above, the direction of feed does not deviate due to offset voltage or the like.

Figure 4:
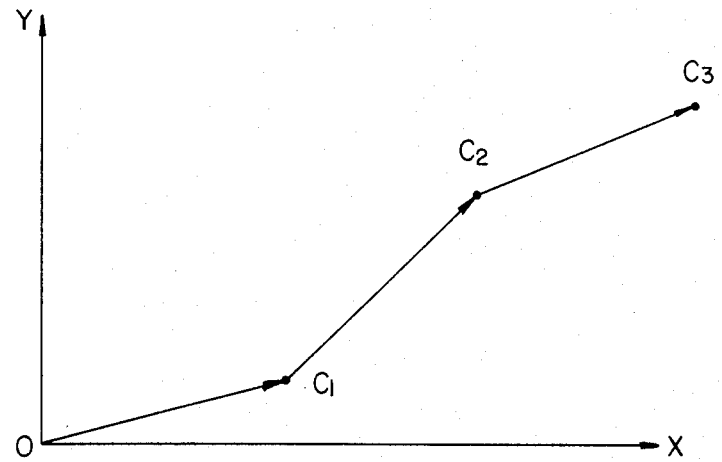

Moreover, by repeating the above-described operation, the feed can be effected along an arbitrary path, such, for instance, as indicated by O→C$_1$→C$_2$→C$_3$ in FIG. 4.

As has been described in the foregoing, according to the present invention, in a system performing arbitrary-direction tracing using a combination tracer control-numerical control unit, the numerical control unit is provided with a signal generating device, such as the controller 18, for generating a signal indicating the angle of a feed shaft according to numerical information representing a path. The tracer control unit is provided with a first coordinate transformation circuit for producing a displacement component signal in the direction of the feed shaft and a second coordinate transformation circuit for converting, according to the signal from the signal generating device, a signal for controlling the feed rate of the feed shaft into signals for controlling the feed rates along the X-axis and the Y-axis. Accordingly, the present invention has the advantages of increased cutting accuracy and speed over the conventional system which controls the feed by numerical control.

We claim:

1. A tracer control system for performing tracing of a model in an arbitrary direction to cut a workpiece using a cutter on a feed shaft, according to the tracing, said tracer control system comprising:
    a tracer head for tracing the surface of the model and generating displacement signals; and
    a combination tracer control-numerical control unit, comprising:
        a numerical control unit, operatively connected to the cutter, for performing numerical control of the cutting of the workpiece by the cutter, comprising signal generating means for generating an angle signal indicating an angle of horizontal movement of the feed shaft on the basis of numerical control information; and
        a tracer control unit, operatively connected to the cutter, said tracer head and said numerical control unit, for performing tracer control according to the displacement signals from said tracer head to control the cutting of the workpiece by the cutter, comprising:
            a first coordinate transformation circuit, operatively connected to said tracer head and said signal generating means, for producing a displacement component signal in the direction of the horizontal movement of the feed shaft on the basis of the displacement signals from the tracer head along an X-axis and a Y-axis and the angle signal;
            feed rate means, operatively connected to said tracer head, said numerical control unit and said first coordinate transformation circuit, for generating a feed rate signal indicating velocity of the horizontal movement of the feed shaft; and
            a second coordinate transformation circuit, operatively connected to said tracer head, said signal generating means and said feed rate means, for converting, in accordance with the angle signal, the feed rate signal into signals for controlling the feed rates along the X-axis and the Y-axis.

2. A system for performing tracing of a model in an arbitrary direction to cut a workpiece using a cutter which moves in a direction defined by first, second and third axes, comprising:
    a tracer head for tracing the surface of the model and generating displacement signals; and
    a combination tracer control-numerical control unit, operatively connected to the cutter and said tracer head, for controlling the direction of movement of the cutter along the first and second axes using numerical control information and converting the displacement signals from said tracer head into velocity control signals for the first, second and third axes of movement of the cutter.

3. A tracer control system as recited in claim 2, wherein the cutter is mounted on a feed shaft and said combination tracer control-numerical control unit comprises:
    a numerical control unit, operatively connected to receive the numerical control information, for generating an angle signal indicating an angle with respect to the first axis of the movement of the feed shaft in a plane defined by the first and second axes based on the numerical control information; and
    a tracer control unit, operatively connected to the cutter, said tracer head and said numerical control unit, for performing tracer control according to the displacement signals from said tracer head and the angle signal from said numerical control unit to control the cutting of the workpiece by the cutter.

4. A tracer control system as recited in claim 3, wherein said tracer control unit is further operatively connected to receive a reference displacement and comprises:
    a displacement calculation circuit, operatively connected to said tracer head, for calculating a composite displacement of the movement of the cutter along the first, second and third axes;
    a subtracter, operatively connected to said displacement calculation circuit and to receive the reference displacement, for generating a displacement difference;
    a first velocity calculation circuit, operatively connected to said subtracter, for generating a normal velocity signal;
    a second velocity calculation circuit, operatively connected to said numerical control unit and said subtracter, for generating a tangential velocity signal;
    a first coordinate transformation circuit, operatively connected to said tracer head and said numerical control unit, for generating a displacement component signal corresponding to the movement of the cutter along the first and second axes;
    a displacement direction indexing circuit, operatively connected to said tracer head and said first coordinate transformation circuit, for generating an indexed angle signal;
    a distribution circuit, operatively connected to said first and second velocity calculation circuits and said displacement direction indexing circuit, for generating first and second velocity control signals; and
    a second coordinate transformation circuit, operatively connected to said numerical control unit and said distribution circuit, for transforming the first velocity control signal into third and fourth velocity control signals in accordance with the angle signal.

5. A tracer control system as recited in claim 3, wherein said numerical control unit comprises:
    signal generating means, operatively connected to said tracer control unit, for generating digital sine and cosine signals as the angle signal, tracing start and stop signals, and amount of movement signals;
    an analog/digital converter, operatively connected to said tracer control unit and said signal generating means, for converting one of the velocity control signals into a digital signal;
    a first digital-analog converter, operatively connected to said tracer control unit and said signal generating means, for converting the digital sine signal into an analog sine signal; and
    a second digital/analog converter, operatively connected to said tracer control unit and said signal generating means, for converting the digital cosine signal into an analog cosine signal.

6. A tracer control system as recited in claim 5, further comprising a drive system, operatively connected to said tracer control unit and said numerical control unit, for driving the cutter, thereby cutting the workpiece, and wherein said combination tracer control-numerical control unit further comprises correction means, operatively connected to said tracer control unit, said numerical control unit and said drive system, for correcting the velocity control signals based on the amount of movement signals.

7. A tracer control system as recited in claim 6, wherein the velocity control signals include first, second and third velocity control signals corresponding to the first, second and third axes, respectively, wherein said drive system comprises:
first, second and third amplifiers, operatively connected to said tracer control unit and said numerical control unit, for amplifying the first, second and third velocity control signals, respectively; and first, second and third motors, operatively connected to said first, second and third amplifiers, for driving the feed shaft along the first, second and third axes, and wherein said correction means comprises:
first and second simulators, operatively connected to said signal generating means, for receiving the amount of movement signals, simulating the delay of said drive system and generating outputs;

first and second position detectors, coupled to the workpiece and to said first and second motors, respectively, for detecting the position of said first and second motors and generating outputs;

a first register, operatively connected to said first simulator and said first position detector, for storing the outputs of said first simulator and said first position detector, and generating a first difference signal;

a second register, operatively connected to said second simulator and said second position detector, for storing the outputs of said second simulator and said second position detector, and generating a second velocity difference signal;

a first adder, operatively connected to said tracer control unit, said first amplifier and said first register, for adding the first velocity difference signal to the first velocity control signal to generate a first corrected velocity control signal; and a second adder, operatively connected to said tracer control unit, said second amplifier and said second register, for adding the second velocity difference signal to the second velocity control signal to generate a second corrected velocity control signal.

* * * * *

UNITED STATES PATENT AND TRADEMARK OFFICE
CERTIFICATE OF CORRECTION

PATENT NO. : 4,534,685
DATED : August 13, 1985
INVENTOR(S) : Komiya et al.

It is certified that error appears in the above-identified patent and that said Letters Patent is hereby corrected as shown below:

Front page, [56] FOREIGN PATENT DOCUMENTS, "55-10675" should be --55-106753--.

Front page, [57] ABSTRACT, line 3, delete "through".

Col. 2, line 6, after "= ω" insert --t--;
      line 37, after "α" insert --and the cos α, respectively,--

Col. 4, line 10, delete "simulators 25 and";
      line 11, delete "26,".

Signed and Sealed this

Eighteenth Day of February 1986

[SEAL]

Attest:

DONALD J. QUIGG

Attesting Officer     Commissioner of Patents and Trademarks